(12) United States Patent
Ghosh

(10) Patent No.: US 9,577,799 B2
(45) Date of Patent: Feb. 21, 2017

(54) WIRELESS DEVICE, METHOD, AND COMPUTER READABLE MEDIA FOR SIGNALING A RESOURCE ALLOCATION IN A HIGH-EFFICIENCY SIGNAL FIELD

(71) Applicant: Intel IP Corporation, Santa Clara, CA (US)

(72) Inventor: Chittabrata Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 6 days.

(21) Appl. No.: 14/751,078

(22) Filed: Jun. 25, 2015

(65) Prior Publication Data

US 2016/0219573 A1    Jul. 28, 2016

Related U.S. Application Data

(60) Provisional application No. 62/108,102, filed on Jan. 27, 2015.

(51) Int. Cl.
*H04L 5/00* (2006.01)
*H04W 72/04* (2009.01)
*H04W 84/12* (2009.01)

(52) U.S. Cl.
CPC ........... *H04L 5/0007* (2013.01); *H04L 5/0023* (2013.01); *H04L 5/0039* (2013.01); *H04L 5/0064* (2013.01); *H04L 5/0091* (2013.01); *H04W 72/042* (2013.01); *H04L 5/0044* (2013.01); *H04W 72/0453* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2016/0066338 A1* | 3/2016 | Kwon | H04L 5/0007 370/330 |
| 2016/0156438 A1* | 6/2016 | Sun | H04L 5/0007 370/330 |
| 2016/0165589 A1* | 6/2016 | Chu | H04L 5/0007 370/329 |
| 2016/0174200 A1* | 6/2016 | Seok | H04W 72/04 370/329 |
| 2016/0278081 A1* | 9/2016 | Chun | H04W 72/0446 |

* cited by examiner

*Primary Examiner* — Mohammad Adhami
(74) *Attorney, Agent, or Firm* — Schwegman Lundberg & Woessner, P.A.

(57) ABSTRACT

Wireless device, computer readable medium, and methods for signaling a resource allocation in a high-efficiency (HE) signal field are disclosed. A HE wireless local area network (HEW) device may include circuitry configured to: generate a HE signal (HE-SIG) field comprising one or more resource allocations each comprising an identical allocation subfield, an allocation or no allocation subfield, if the identical allocation subfield indicates the resource allocation is not identical, an allocation size if the identical allocation subfield indicates the resource allocation is not identical, and a station identification (ID), if the allocation or no allocation subfield indicates there is an allocation. The circuitry is further configured to transmit the HE-SIG field to one or more HEW stations. The allocation size may be based on a number of basic allocation units. The resource allocations may be allocated from a left side of a bandwidth to a right side of a bandwidth.

24 Claims, 6 Drawing Sheets

BSS

WIRELESS DEVICE, METHOD, AND COMPUTER READABLE MEDIA FOR SIGNALING A RESOURCE ALLOCATION IN A HIGH-EFFICIENCY SIGNAL FIELD

PRIORITY CLAIM

This application claims the benefit of priority under 35 USC 119(e) to U.S. Provisional Patent Application Ser. No. 62/108,102, filed Jan. 27, 2015, both of which are incorporated herein by reference in its entirety.

TECHNICAL FIELD

Some embodiments related to transmitting and receiving signal fields in wireless local area networks (WLANs) operating with both legacy standards and with a high-efficiency (HE) WLAN (HEW) or Institute of Electrical and Electronic Engineers (IEEE) 802.11 ax standard. Some embodiments relate to generating, receiving, transmitting, interpreting, and/or operating in accordance with signal fields that include an allocation of the wireless medium to stations.

BACKGROUND

One issue in WLANs is efficient use of the wireless medium. Users of the wireless medium often demand faster response times and greater bandwidth for their applications. Moreover, the wireless medium may be shared by more than one wireless device. Often a master station or device may allocate the resources of the wireless medium for other wireless devices. Additionally, the wireless medium may be shared by wireless devices that operate different wireless communication protocols.

Thus there are general needs for systems and methods for efficiently using the wireless medium, and in particular, efficiently signaling the allocation of the wireless medium.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
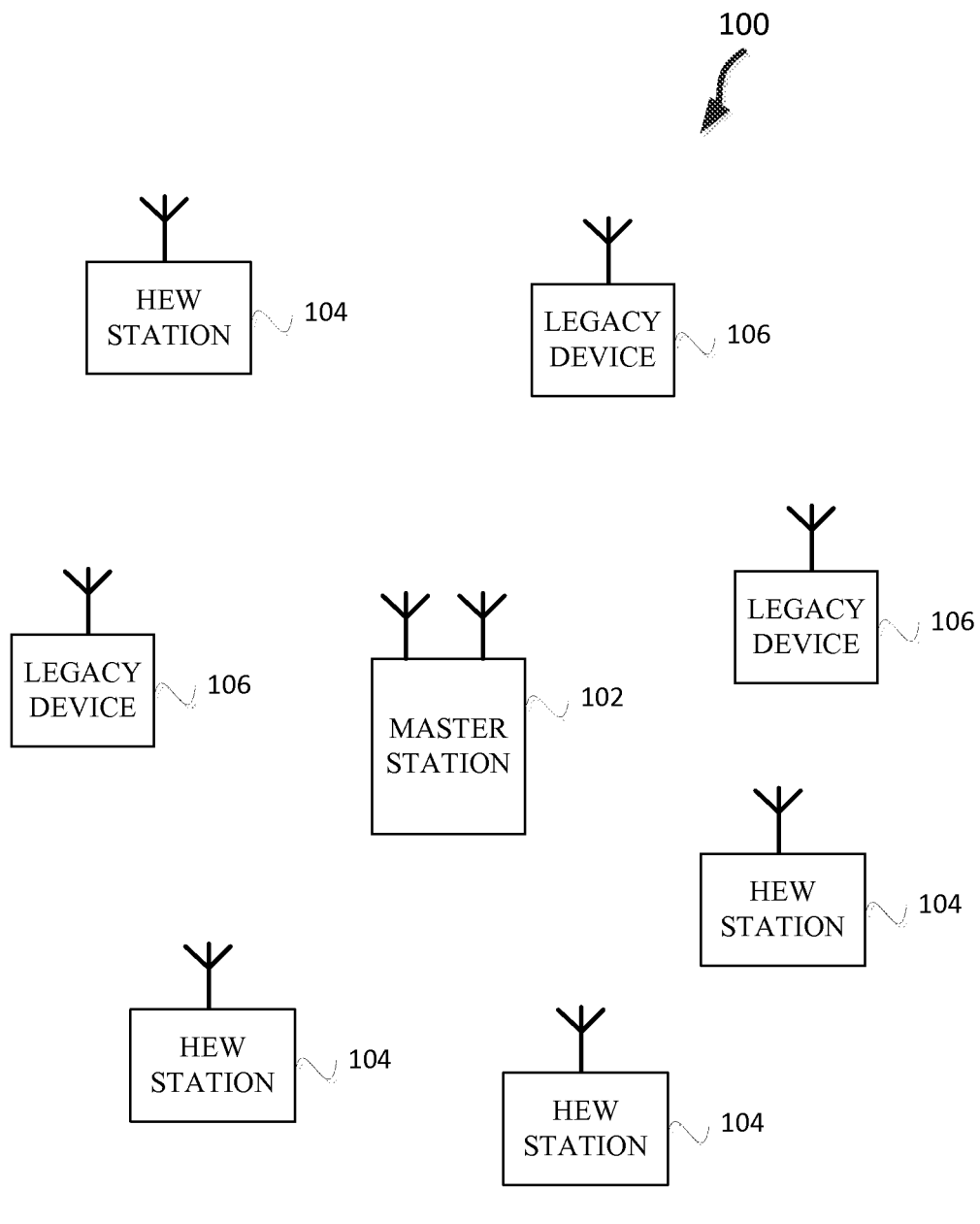
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11 ax. The IEEE 802.11 protocol may include using OFDMA, time division multiple access (TDMA), and/or code division multiple access (CDMA). The IEEE 802.11 protocol may include a multiple access technique. For example, the IEEE 802.11 protocol may include space-division multiple access (SDMA) and/or MU-MIMO.

The legacy devices 106 may operate in accordance with one or more of IEEE 802.11 a/g/ag/n/ac, IEEE 802.11-2012, or another legacy wireless communication standard. The legacy devices 106 may be STAs or IEEE STAs.

The HEW STAs 104 may be wireless transmit and receive devices such as cellular telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The BSS 100 may operate on a primary channel and one or more secondary channels or sub-channels. The BSS 100 may include one or more master stations 102. In accordance with some embodiments, the master station 102 may communicate with one or more of the HEW devices 104 on one or more of the secondary channels or sub-channels or the primary channel. In accordance with some embodiments, the master station 102 communicates with the legacy devices 106 on the primary channel. In accordance with some embodiments, the master station 102 may be configured to communicate concurrently with one or more of the HEW STAs 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth as a sub-channel, and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.0 MHz, 2.5 MHz, 5 MHz and 10 MHz, or a combination thereof or another bandwidth that is less or equal to the available bandwidth, may also be used. A HEW frame may be configured for transmitting a number of spatial streams, which may be in accordance with MU-MIMO.

In other embodiments, the master station 102, HEW STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period.

The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating. In accordance with some embodiments, during the master-sync transmission the HEW STAs 104 may contend for the wireless medium with the legacy devices 106 being excluded from contending for the wireless medium during the master-sync transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the master station 102 and/or HEW stations 104 are configured to perform one or more of the functions and/or methods described herein in conjunction with FIGS. 1-6 such as generating, receiving, and/or transmitting HE-SIG fields that indicate an allocation of the wireless medium to one or more HEW stations 104.

Figure 2:
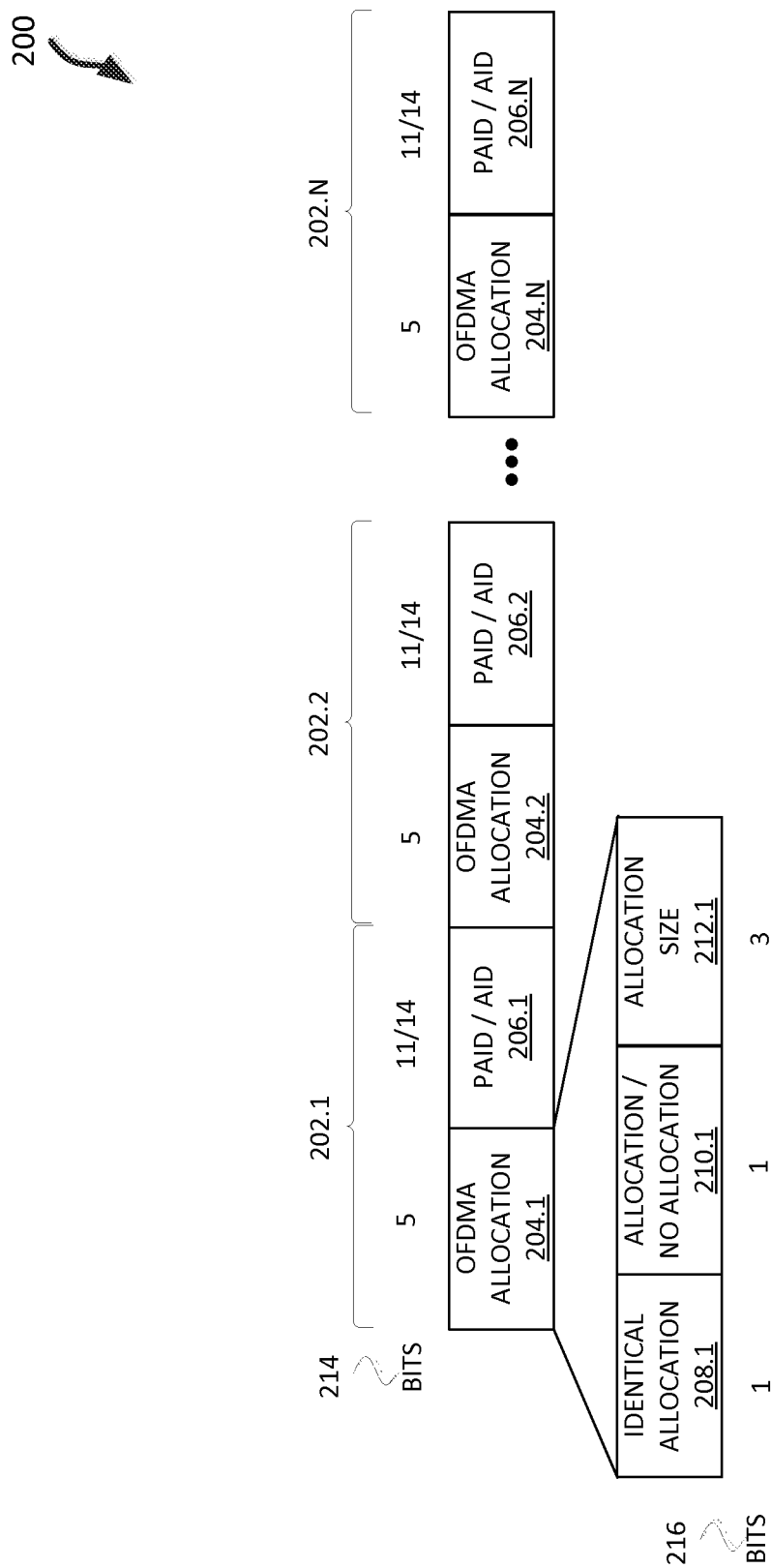
FIG. 2 illustrates a high-efficiency signal B (HE-SIG-B) field for signaling resource allocations in accordance with some embodiments.

FIG. 2 illustrates a high-efficiency signal B (HE-SIG-B) 200 field for signaling resource allocations in accordance with some embodiments. Illustrated in FIG. 2 are resource allocations 202.1 through 202.n, bits 214, and bits 216. Each resource allocation 202 may include an OFDMA allocation 204 and partial association identification (PAID) or association identification (AID) 206. In some embodiments the PAID or AID 206 may include a group identifier that may have been assigned to the HEW station 104 by the master station 102. The HE-SIG-B 200 field for signaling resource allocations may allocate a bandwidth from left to right in a number of basic resource units where left is the lower frequency of the bandwidth and right is the higher frequency of the bandwidth. A basic resource unit may be a number of tones such as 26 tones or 242 tones. In some embodiments the basic resource unit may be a different number of tones. In some embodiments the number of tones of the basic resource unit may vary by a few tones to account for tones such as edge tones or center tones. A basic resource unit may be a sub-channel such as a 2 MHz sub-channel. The basic resource units across a bandwidth may be defined in one or more wireless communication standards and may be shared by the HEW stations 104 and/or master station 102.

Each resource allocation 202 may allocate a number of basic resource units or indicate that the number of basic resource units is not allocated. For example, due to interference and/or an overlapping BSS some subchannels may not be allocated.

The bits 214 indicate an example number of bits for the subfields. For example, 5 bits for OFDMA allocation 204 and 11 or 14 bits for PAID/AID 206. Each OFDMA allocation 204 may include an identical allocation 208, allocation/no allocation 210, and allocation size 212. A number of bits for the subfields in the OFDMA allocation 204 may be indicated by bits 216. The identical allocation 208 may indicate whether or not the resource allocation 202 is identical to the previous resource allocation 202. In some embodiments identical allocation 208 may be one bit. In some embodiments a one in the one bit indicates that the resource allocation 202 is identical to the previous resource allocation 202. In some embodiments if the identical allocation 208 indicates the resource allocation 202 is identical to the previous resource allocation 202, then the allocation/no allocation 210 subfield and the allocation size 212 subfield may not be present.

The allocation/no allocation subfield 210 may indicate whether or not the resource allocation 202 is an allocation to a HEW station 104. For example, if allocation/no allocation 210 indicates that there is an allocation then the PAID/AID 206 subfield indicates to which HEW station 104 the resource allocation 202 is for. If the allocation/no allocation 210 subfield indicates that there is not an allocation then the portion of the bandwidth indicated by the resource allocation 202 is not allocated for use. The allocation/no allocation 210 subfield may be one bit. In some embodiments the allocation/no allocation 210 subfield may be a one to indicate that there is no allocation for the resource allocation 202.

The allocation size 212 subfield may indicate the number of basic resource units allocated. The basic resource units may be allocated from a left side of the bandwidth to a right side of the bandwidth. Table 1 illustrates a column for the name of the allocation, the allocation size, and the bits in accordance with some embodiments. For example, the first row has a name of allocation size 1, an allocation size of 1×26 tones, which may be a basic resource unit, and bits 000 that are used to indicate the row. In example embodiments three bits may be used to indicate the allocation size 212. A different number of bits may be used to indicate the allocation sizes.

TABLE 1

Example Embodiment of Allocation Sizes

| Name | Allocation Size | Bits |
| --- | --- | --- |
| Allocation Size 1 | 1 × 26 tones | Bits 000 |
| Allocation Size 2 | 2 × 26 tones | Bits 001 |
| Allocation Size 3 | 4 × 26 tones | Bits 010 |
| Allocation Size 4 | 1 × 242 tones | Bits 011 |
| Allocation Size 5 | 2 × 242 tones | Bits 100 |
| Allocation Size 6 | 4 × 242 tones (single user allocation) | Bits 101 |
| Allocation Sizes 7 and 8 | Reserved | Bits 110 and 111 |

In example embodiments the PAID/AID 206 subfield indicates an address of a HEW device 104. In some embodiments the address may be indicated in a different way than a PAID or AID. For example, the master station 102 may provide an identifier to a HEW station 104 when the HEW station 104 attaches to the master station 102. If allocation/no allocation 210 indicates there is not an allocation, then the resource allocation 202 may not include the PAID/AID 206 subfield.

One skilled in the art would recognize that the subfields of the allocation may be in a different order and/or a different size, and that the allocation may be from right to left rather than left to right. The left may be the lower frequency of the bandwidth and the right may be the higher frequency of the bandwidth.

Figure 3:
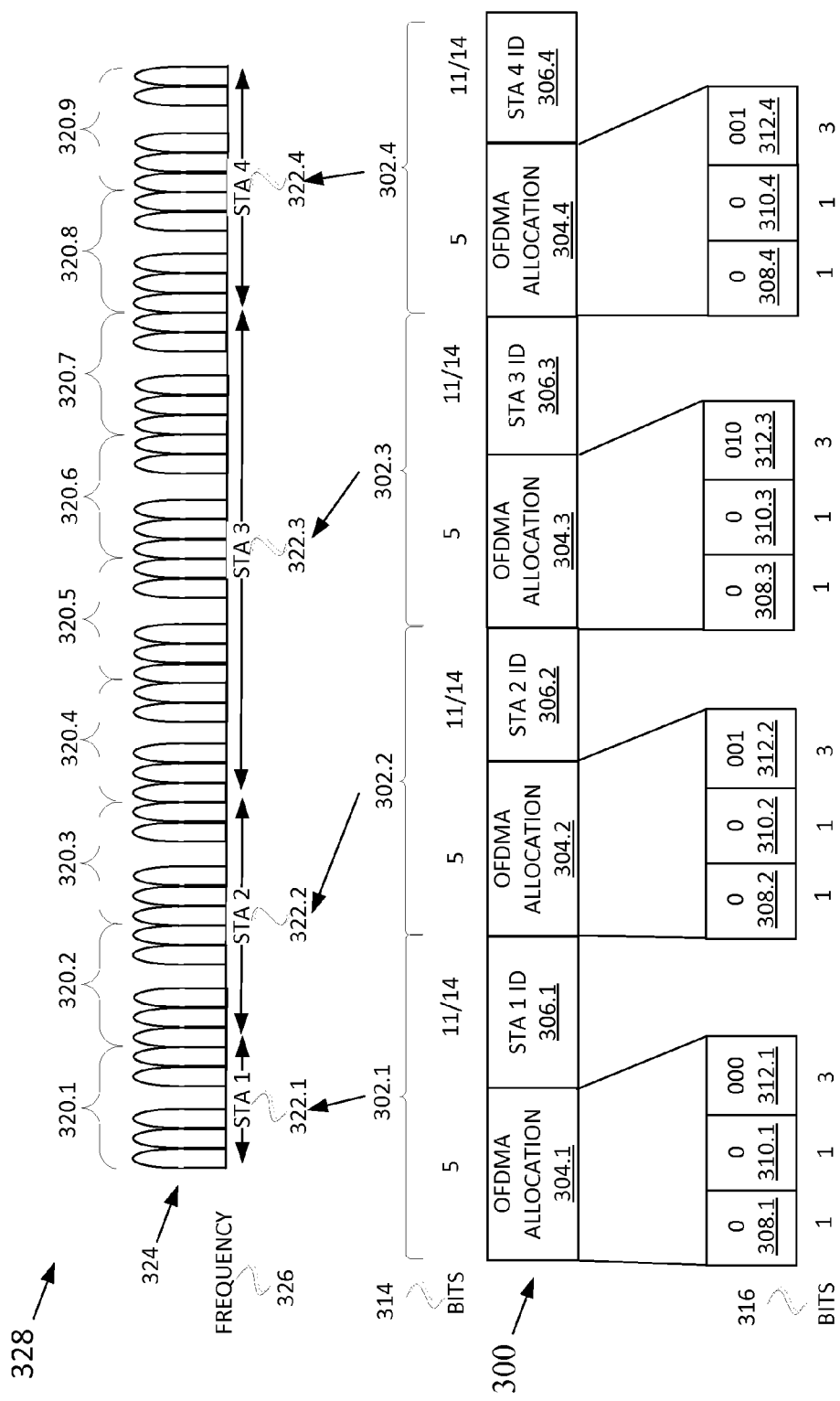
FIG. 3 illustrates an example of a HE-SIG-B field for signaling resource allocations and the corresponding allocations in accordance with some embodiments.

FIG. 3 illustrates an example of a HE-SIG-B 300 field for signaling resource allocations 302 and the corresponding allocations 322 in accordance with some embodiments. Illustrated in FIG. 3 are a HE-SIG-B 300, and a portion of the wireless bandwidth 328. The frequency 326 is illustrated along a horizontal axis with subcarriers or tones 324. The frequency 326 may be a 20 MHz subchannel. The portion of the wireless bandwidth 328 may be divided into basic resource units 320. The allocations 322 for STA 1, STA 2, STA 3, and STA 4 illustrate the allocations 322 for STA 1, STA 2, STA 3, and STA 4 of the portion of the wireless bandwidth 328. STA 1, STA 2, STA 3, and STA 4 may be HEW stations 104 or master stations 102.

The allocations 322 may be in accordance with the embodiment described in conjunction with FIG. 2. Allocation 302.1 may be for STA 1. Identical allocation 308.1 is zero indicating that the allocation 302.1 is not identical to a previous allocation. In this case there is no previous allocation 302. The allocation/no allocation 310.1 is zero indicating that there is an allocation. The allocation size is 000, which according to Table 1 indicates an allocation size of 1×26 tones. The STA 1 ID306.1 may be an identification of STA 1. The allocation 302.1 corresponds to the allocation 322.1, which is one basic unit 320.1 and starts from the left side of the frequency 326.

Allocation 302.2 may be for STA 2. Identical allocation 308.2 is zero indicating that the allocation 302.2 is not identical to a previous allocation. The allocation/no allocation 310.2 is zero indicating that there is an allocation. The allocation size is 001, which according to Table 1 indicates an allocation size of 2×26 tones. The STA 2 ID 306.2 may be an identification of STA 2. The allocation 302.2 corresponds to the allocation 322.2, which is two basic units 320.2 and 320.3, and continues from the previous allocation 322.1.

Allocation 302.3 may be for STA 3. Identical allocation 308.3 is zero indicating that the allocation 302.3 is not identical to a previous allocation. The allocation/no allocation 310.3 is zero indicating that there is an allocation. The allocation size is 010, which according to Table 1 indicates an allocation size of 4×26 tones. The STA 3 ID 306.3 may be an identification of STA 3. The allocation 302.3 corresponds to the allocation 322.3, which is four basic units 320.4, 320.5, 320.6, 320.7 and continues from the previous allocation 322.2.

Allocation 302.4 may be for STA 4. Identical allocation 308.4 is zero indicating that the allocation 302.4 is not identical to a previous allocation. The allocation/no allocation 310.4 is zero indicating that there is an allocation. The allocation size is 001, which according to Table 1 indicates an allocation size of 2×26 tones. The STA 4 ID 306.4 may be an identification of STA 4. The allocation 302.4 corresponds to the allocation 322.4, which is two basic units 320.8 and 320.9, and continues from the previous allocation 322.3.

Figure 4:
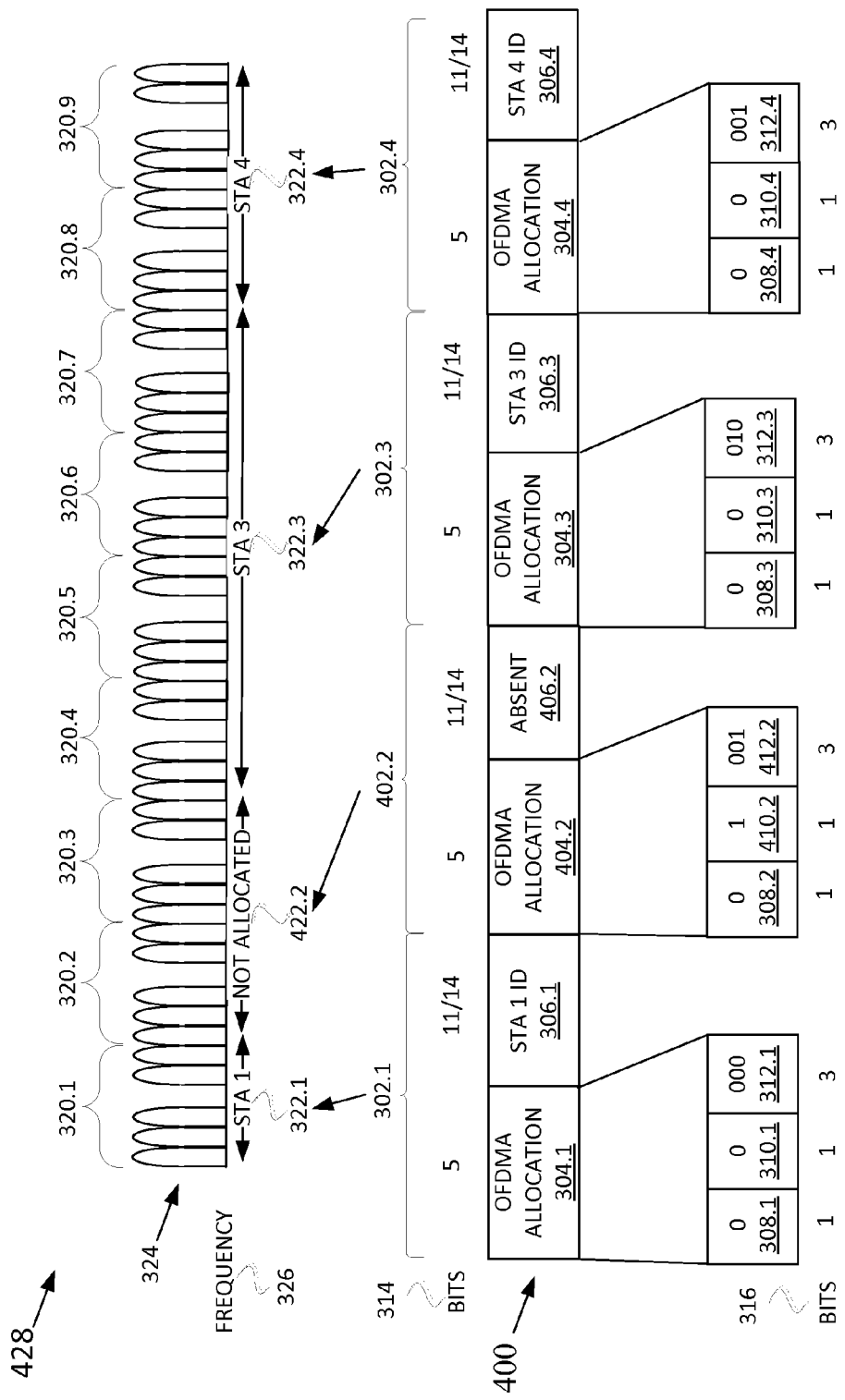
FIG. 4 illustrates an example of a HE-SIG-B field for signaling resource allocations and the corresponding allocations in accordance with some embodiments.

FIG. 4 illustrates an example of a HE-SIG-B 400 field for signaling resource allocations and the corresponding allocations in accordance with some embodiments. Illustrated in FIG. 4 are a HE-SIG-B 400, and a portion of the wireless bandwidth 428. FIG. 4 is similar to FIG. 3 with some differences. In FIG. 4 resource allocation 302.2 has been changed to resource allocation 402.2 with the corresponding change to allocation 422.2. OFDMA allocation 404.2 comprises identical allocation 308.2, allocation/no allocation 410.2, and allocation size 412.2. Identical allocation 308.2 is still zero indicating that the allocation 302.2 is not identical to a previous allocation. The allocation/no allocation 410.2 is now one indicating that there is not an allocation. The allocation size is 001, which according to Table 1 indicates an allocation size of 2×26 tones. The PAID/AID 406.2 may now be absent. In some embodiments PAID/AID 406.2 is still present but does not contain a value that is used for a PAID/AID of a STA. The allocation 402.2 corresponds to the allocation 422.2, which is two basic units 320.2 and 320.3, and continues from the previous allocation 302.1, but is not allocated to any STA in accordance with this HE-SIG-B 400.

Figure 5:
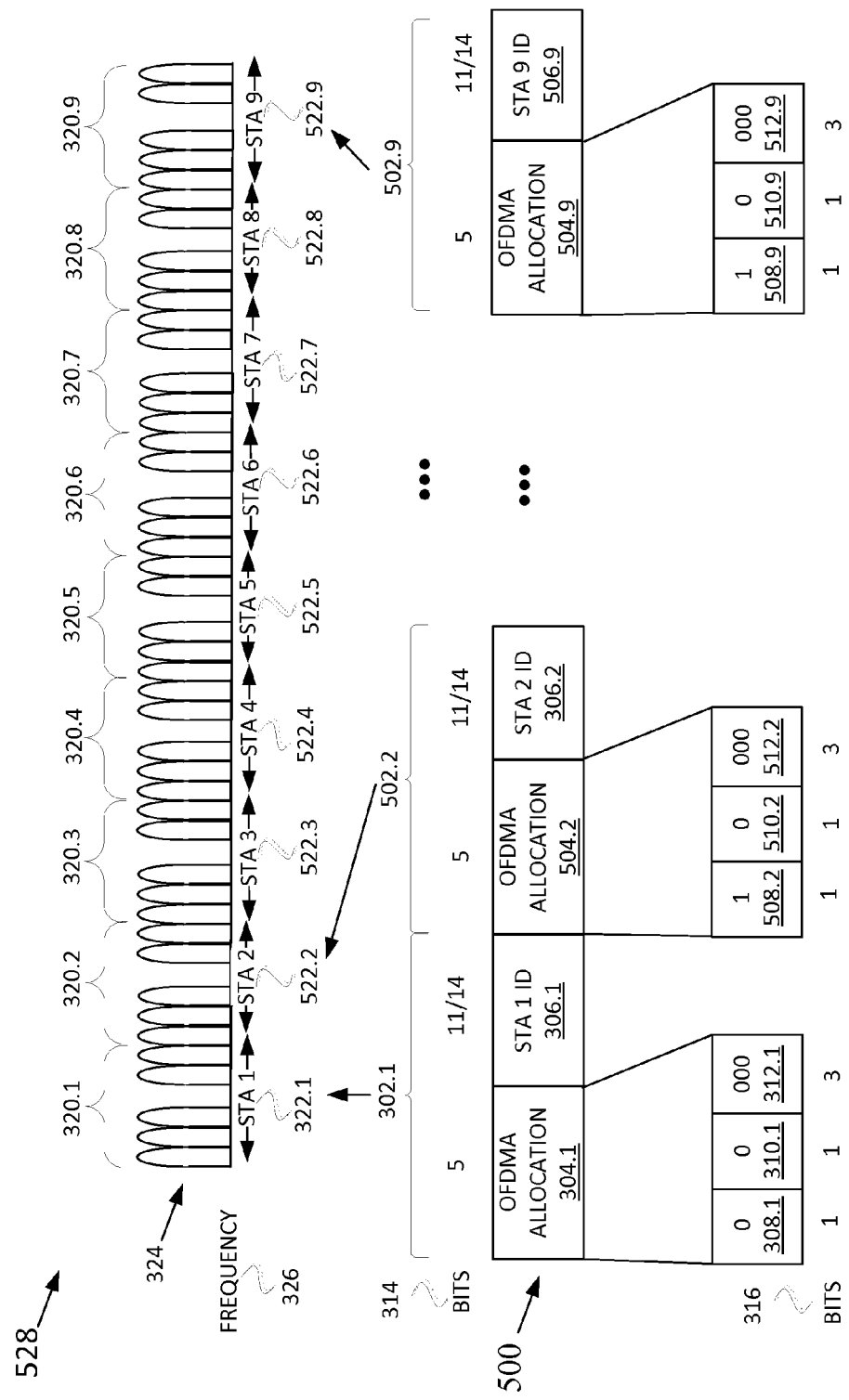
FIG. 5 illustrates an example of a HE-SIG-B field for signaling resource allocations and the corresponding allocations in accordance with some embodiments.

FIG. 5 illustrates an example of a HE-SIG-B 500 field for signaling resource allocations and the corresponding allocations in accordance with some embodiments. Illustrated in FIG. 5 are a HE-SIG-B 500, and a portion of the wireless bandwidth 528. FIG. 5 is similar to FIG. 3 with some differences. Resource allocations 502.2 through 502.4 (not illustrated) have been changed and new resource allocations 502.5 (not illustrated) through 502.9 are new. Resource allocation 502.2 comprises OFDMA allocation 504.2 and STA 2 ID306.2. The OFDMA allocation 504.2 includes identical allocation 508.1 which is now one to indicate that the allocation is identical to the previous allocation. Allocation/no allocation 510.2 and allocation size 512.2 are not used and may not be present. The resource allocation 502.2 corresponds to allocation 522.2 which is the same as 302.1 with the next 1×26 tones or basic unit allocated to STA 2.

The resource allocations 502.3 through 502.9 are the same as resource allocation 502.2 for the corresponding STA. For example, resource allocation 502.9 includes OFDMA allocation 504.9 and STA 9 ID 506.9. The STA 9 ID 506.9 may be an identification that a master station 102 may use to identify STA 9. OFDMA allocation 504.9 may include identical allocation 508.9, allocation/no allocation 510.9, and allocation size 512.9. Identical allocation 508.9 may be one to indicate the resource allocation 502.9 is the same as resource allocation 502.8 with the subsequent 1×26 tones which is a base resource unit 320.9. Allocation/no allocation 510.9 and allocation size 512.9 may not be present, and the values may not be used to indicate the resource allocation 502.9.

Figure 6:
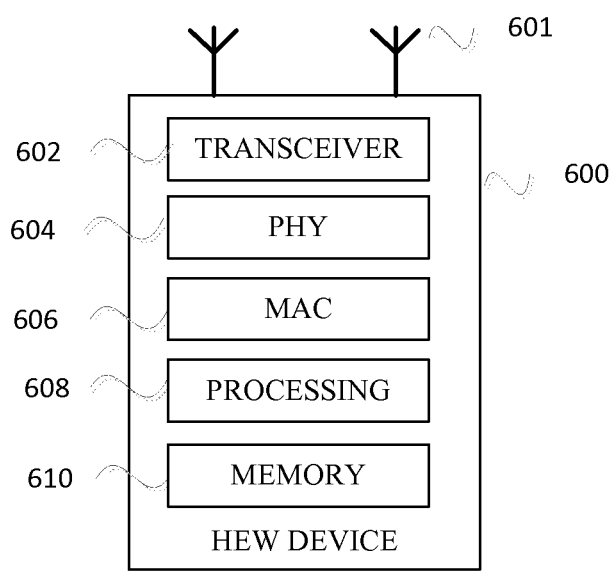
FIG. 6 illustrates a HEW device in accordance with some embodiments.

FIG. 6 illustrates a HEW device 600 in accordance with some embodiments. HEW device 600 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 600 may be suitable for operating as master station 102 (FIG. 1) or a HEW STA 104 (FIG. 1). In accordance with embodiments, HEW device 600 may include, among other things, a transmit/receive element 601 (for example an antenna), a transceiver 602, physical (PHY) circuitry 604, and media access control (MAC) circuitry 606. PHY circuitry 604 and MAC circuitry 606 may be HEW compliant layers and may also be compliant with one or more legacy IEEE 802.11 standards. MAC circuitry 606 may be arranged to configure packets such as a physical layer convergence procedure (PLCP) protocol data unit (PPDUs) and arranged to transmit and receive PPDUs, among other things. HEW device 600 may also include circuitry 608 and memory 610 configured to perform the various operations described herein. The circuitry 608 may be coupled to the transceiver 602, which may be coupled to the transmit/receive element 701. While FIG. 6 depicts the circuitry 608 and the transceiver 602 as separate components, the circuitry 608 and the transceiver 602 may be integrated together in an electronic package or chip.

In some embodiments, the MAC circuitry 606 may be arranged to contend for a wireless medium during a contention period to receive control of the medium for the HEW control period and configure an HEW PPDU. In some embodiments, the MAC circuitry 606 may be arranged to contend for the wireless medium based on channel contention settings, a transmitting power level, and a CCA level.

The PHY circuitry 604 may be arranged to transmit the HEW PPDU. The PHY circuitry 604 may include circuitry for modulation/demodulation, upconversion/downconversion, filtering, amplification, etc. In some embodiments, the circuitry 608 may include one or more processors. The circuitry 608 may be configured to perform functions based on instructions being stored in a RAM or ROM, or based on special purpose circuitry. The circuitry 608 may be termed processing circuitry in accordance with some embodiments. The circuitry 608 may include a processor such as a general purpose processor or special purpose processor. The circuitry 608 may implement one or more functions associated with transmit/receive elements 601, the transceiver 602, the PHY circuitry 604, the MAC circuitry 606, and/or the memory 610.

In some embodiments, the circuitry 608 may be configured to perform one or more of the functions and/or methods described herein and/or in conjunction with FIGS. 1-6 such as generating, receiving, and/or transmitting HE-SIG fields that indicate an allocation of the wireless medium to one or more HEW stations 104.

In some embodiments, the transmit/receive elements 601 may be two or more antennas that may be coupled to the PHY circuitry 604 and arranged for sending and receiving signals including transmission of the HEW packets. The transceiver 602 may transmit and receive data such as HEW PPDU and packets that include an indication that the HEW device 600 should adapt the channel contention settings according to settings included in the packet. The memory 610 may store information for configuring the other circuitry to perform operations for configuring and transmitting HEW packets and performing the various operations to perform one or more of the functions and/or methods described herein and/or in conjunction with FIGS. 1-6 such as generating, receiving, and/or transmitting HE-SIG fields that indicate an allocation of the wireless medium to one or more HEW stations 104.

In some embodiments, the HEW device 600 may be configured to communicate using OFDM communication signals over a multicarrier communication channel. In some embodiments, HEW device 600 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 600 may use 4× symbol duration of 802.11n or 802.11 ac.

In some embodiments, an HEW device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 601 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is an apparatus of a high-efficiency (HE) wireless local area network (HEW) device, including circuitry configured to: generate a HE signal (HE-SIG) field comprising one or more resource allocations the resource allocations including: an identical allocation subfield, an allocation or no allocation subfield and an allocation size, if the identical allocation subfield indicates the resource allocation is not identical, and a station identification (ID), if the allocation or no allocation subfield indicates there is an allocation; and transmit the HE-SIG field to one or more HEW stations.

In Example 2, the subject matter of Example 1 can optionally include where the allocation size is based on a number of basic allocation units, wherein each basic allocation unit comprises a same number of tones and wherein the same number of tones is between 22 through 242 inclusive tones.

In Example 3, the subject matter of Examples 1 and 2 can optionally include where the one or more resource allocations are allocated from a left side of a bandwidth to a right side of a bandwidth wherein the left side of the bandwidth is a lower frequency portion of the bandwidth and the right side of the bandwidth is a higher frequency portion of the bandwidth.

In Example 4, the subject matter of any of Examples 1-3 can optionally include where the bandwidth is one from the following group: 20 MHz, 40 MHz, 80 MHz, 160 MHz, and 320 MHz.

In Example 5, the subject matter of any of Examples 1-4 can optionally include where the station ID is one from the following group: an association identification, a partial association identification, and a group identifier with one of the association identification or the partial association identification.

In Example 6, the subject matter of any of Examples 1-5 can optionally include where the circuitry is further configured to: determine a portion of the bandwidth is in use by an overlapping basic service set; and generate the resource allocations to indicate that the portion of the bandwidth is not allocated.

In Example 7, the subject matter of any of Examples 1-6 can optionally include where if the identical allocation subfield indicates the resource allocation is identical, then the resource allocation is identical to a resource allocation of a previous user.

In Example 8, the subject matter of any of Examples 1-7 can optionally include where the identical allocation subfield is one bit and the allocation or no allocation subfield is one bit.

In Example 9, the subject matter of Example 8 can optionally include where the allocation size is based on a number of basic allocation units.

In Example 10, the subject matter of Example 9 can optionally include where each basic allocation unit is 26 tones or 242 tones.

In Example 11, the subject matter of any of Examples 1-10 can optionally include where the HEW device is one from the following group: an Institute of Electronic and Electrical Engineers (IEEE) 802.11ax access point and an IEEE 802.11ax station.

In Example 12, the subject matter of any of Examples 1-11 can optionally include where the circuitry is configured to operate in accordance with orthogonal frequency division multiple access (OFDMA).

In Example 13, the subject matter of any of Examples 1-12 can optionally include where the circuitry comprises transceiver circuitry and processing circuitry.

In Example 14, the subject matter of any of Examples 1-13 can optionally include memory coupled to the circuitry; and, one or more antennas coupled to the circuitry.

Example 15 is a method performed by a high-efficiency (HE) wireless local area network (WLAN) (HEW) device. The method including generating a HE signal (HE-SIG) field comprising one or more resource allocations the resource allocations comprising: an identical allocation subfield, an allocation or no allocation subfield and an allocation size, if the identical allocation subfield indicates the resource allocation is not identical, and a station identification (ID), if the allocation or no allocation subfield indicates there is an allocation; and transmitting the HE-SIG field to one or more HEW stations.

In Example 16, the subject matter of Example 15 can optionally include where the allocation size is based on a number of basic allocation units.

In Example 17, the subject matter of Examples 15 or 16 can optionally include where the one or more resource allocations are allocated from a left side of a bandwidth to a right side of a bandwidth.

Example 18 is an apparatus of a high-efficiency (HE) station including circuitry configured to: receive a HE signal (HE-SIG) field comprising one or more resource allocations each comprising an identical allocation subfield, an allocation or no allocation subfield, an allocation size, and a station identification (ID); and determine whether the HE-SIG indicates a resource allocation for the HE station, wherein the HE-SIG field is received from a master station.

In Example 19, the subject matter of Example 18 can optionally include where the allocation size is based on a number of basic allocation units.

In Example 20, the subject matter of Examples 18 and 19 can optionally include where the one or more resource allocations allocate resources from a left edge of a channel to the right edge of the channel.

In Example 21, the subject matter of any of Examples 18-20 can optionally include where the bandwidth is one from the following group: 20 MHz, 40 MHz, 80 MHz, 160 MHz, and 320 MHz.

In Example 22, the subject matter of any of Examples 18-21 can optionally include where the circuitry is configured to operate in accordance with orthogonal frequency division multiple access (OFDMA) and in accordance with Institute of Electronic and Electrical Engineers (IEEE) 802.11 ax.

In Example 23, the subject matter of any of Examples 18-22 can optionally include memory coupled to the circuitry; and one or more antennas coupled to the circuitry.

Example 24 is a non-transitory computer-readable storage medium that stores instructions for execution by one or more processors of a high-efficiency (HE) wireless local-area network (WLAN) (HEW) master station, the operations to configure the one or more processors to cause the HEW master station to: generate a HE signal (HE-SIG) field comprising one or more resource allocations the resource allocations comprising: an identical allocation subfield, an allocation or no allocation subfield and an allocation size, if the identical allocation subfield indicates the resource allocation is not identical, and a station identification (ID), if the allocation or no allocation subfield indicates there is an allocation; and transmit the HE-SIG field to one or more HEW stations.

In Example 25, the subject matter of Example 24 can optionally include where the allocation size is based on a number of basic allocation units.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) wireless local area network (HEW) device, comprising circuitry configured to:
generate a HE signal (HE-SIG) field comprising one or more resource allocations, the resource allocations comprising:
an identical allocation subfield that is one bit,
an allocation or no allocation subfield that is one bit and an allocation size, when the identical allocation subfield indicates the resource allocation is not identical, and
a station identification (ID), when the allocation or no allocation subfield indicates there is an allocation; and
transmit the HE-SIG field to one or more HEW stations.

2. The apparatus of the HEW device of claim 1, wherein the allocation size is based on a number of basic allocation units, wherein each basic allocation unit comprises a same number of tones and wherein the same number of tones is between 22 through 242 inclusive tones.

3. The apparatus of the HEW device of claim 1, wherein the one or more resource allocations are allocated from a left side of a bandwidth to a right side of a bandwidth wherein the left side of the bandwidth is a lower frequency portion of the bandwidth and the right side of the bandwidth is a higher frequency portion of the bandwidth.

4. The apparatus of the HEW device of claim 1, wherein the bandwidth is one from the following group: 20 MHz, 40 MHz, 80 MHz, 160 MHz, and 320 MHz.

5. The apparatus of the HEW device of claim 1, wherein the station ID is one from the following group: an association identification, a partial association identification, and a group identifier with one of the association identification or the partial association identification.

6. The apparatus of the HEW device of claim 1, wherein the circuitry is further configured to:
determine a portion of the bandwidth is in use by an overlapping basic service set; and
generate the resource allocations to indicate that the portion of the bandwidth is not allocated.

7. The apparatus of the HEW device of claim 1, wherein if the identical allocation subfield indicates the resource allocation is identical, then the resource allocation is identical to a resource allocation of a previous user.

8. The apparatus of the HEW device of claim 1, wherein the allocation size is based on a number of basic allocation units.

9. The apparatus of the HEW device of claim 8, wherein each basic allocation unit is 26 tones or 242 tones.

10. The apparatus of the HEW device of claim 1, wherein the HEW device is one from the following group: an Institute of Electronic and Electrical Engineers (IEEE) 802.11ax access point and an IEEE 802.11ax station.

11. The apparatus of the HEW device of claim 1, wherein the circuitry is configured to operate in accordance with orthogonal frequency division multiple access (OFDMA).

12. The apparatus of the HEW device of claim 1, wherein the circuitry comprises transceiver circuitry and processing circuitry.

13. The apparatus of the HEW device of claim 1, further comprising memory coupled to the circuitry; and, one or more antennas coupled to the circuitry.

14. A method performed by a high-efficiency (HE) wireless local area network (WLAN) (HEW) device, the method comprising:
generating a HE signal (HE-SIG) field comprising one or more resource allocations the resource allocations comprising:
an identical allocation subfield that is one bit,
an allocation or no allocation subfield that is one bit and an allocation size, when the identical allocation subfield indicates the resource allocation is not identical, and
a station identification (ID), when the allocation or no allocation subfield indicates there is an allocation; and
transmitting the HE-SIG field to one or more HEW stations.

15. The method of claim 14, wherein the allocation size is based on a number of basic allocation units.

16. The method of claim 14, wherein the one or more resource allocations are allocated from a left side of a bandwidth to a right side of a bandwidth.

17. An apparatus of a high-efficiency (HE) station comprising circuitry configured to:
receive a HE signal (HE-SIG) field comprising one or more resource allocations each comprising an identical allocation subfield that is one bit, an allocation or no allocation subfield that is one bit, an allocation size, and a station identification (ID); and
determine whether the HE-SIG indicates a resource allocation for the HE station, wherein the HE-SIG field is received from a master station.

18. The apparatus of the HE station of claim 17, wherein the allocation size is based on a number of basic allocation units.

19. The apparatus of the HE station of claim 17, wherein the one or more resource allocations allocate resources from a left edge of a channel to the right edge of the channel.

20. The apparatus of the HE station of claim 17, wherein the bandwidth is one from the following group: 20 MHz, 40 MHz, 80 MHz, 160 MHz, and 320 MHz.

21. The apparatus of the HE station of claim 17, wherein the circuitry is configured to operate in accordance with orthogonal frequency division multiple access (OFDMA) and in accordance with Institute of Electronic and Electrical Engineers (IEEE) 802.11ax.

22. The apparatus of the HE station of claim 17, further comprising memory coupled to the circuitry; and one or more antennas coupled to the circuitry.

23. A non-transitory computer-readable storage medium that stores instructions for execution by one or more processors of a high-efficiency (HE) wireless local-area network (WLAN) (HEW) master station, the operations to configure the one or more processors to cause the HEW master station to:
generate a HE signal (HE-SIG) field comprising one or more resource allocations the resource allocations comprising:
an identical allocation subfield that is one bit,
an allocation or no allocation subfield that is one bit and an allocation size, when the identical allocation subfield indicates the resource allocation is not identical, and
a station identification (ID), when the allocation or no allocation subfield indicates there is an allocation; and
transmit the HE-SIG field to one or more HEW stations.

24. The non-transitory computer-readable storage medium of claim 23, wherein the allocation size is based on a number of basic allocation units.

* * * * *